July 6, 1943. C. T. McGILL 2,323,341
PROPORTIONAL CHEMICAL FEEDER
Filed Oct. 17, 1938 2 Sheets-Sheet 1
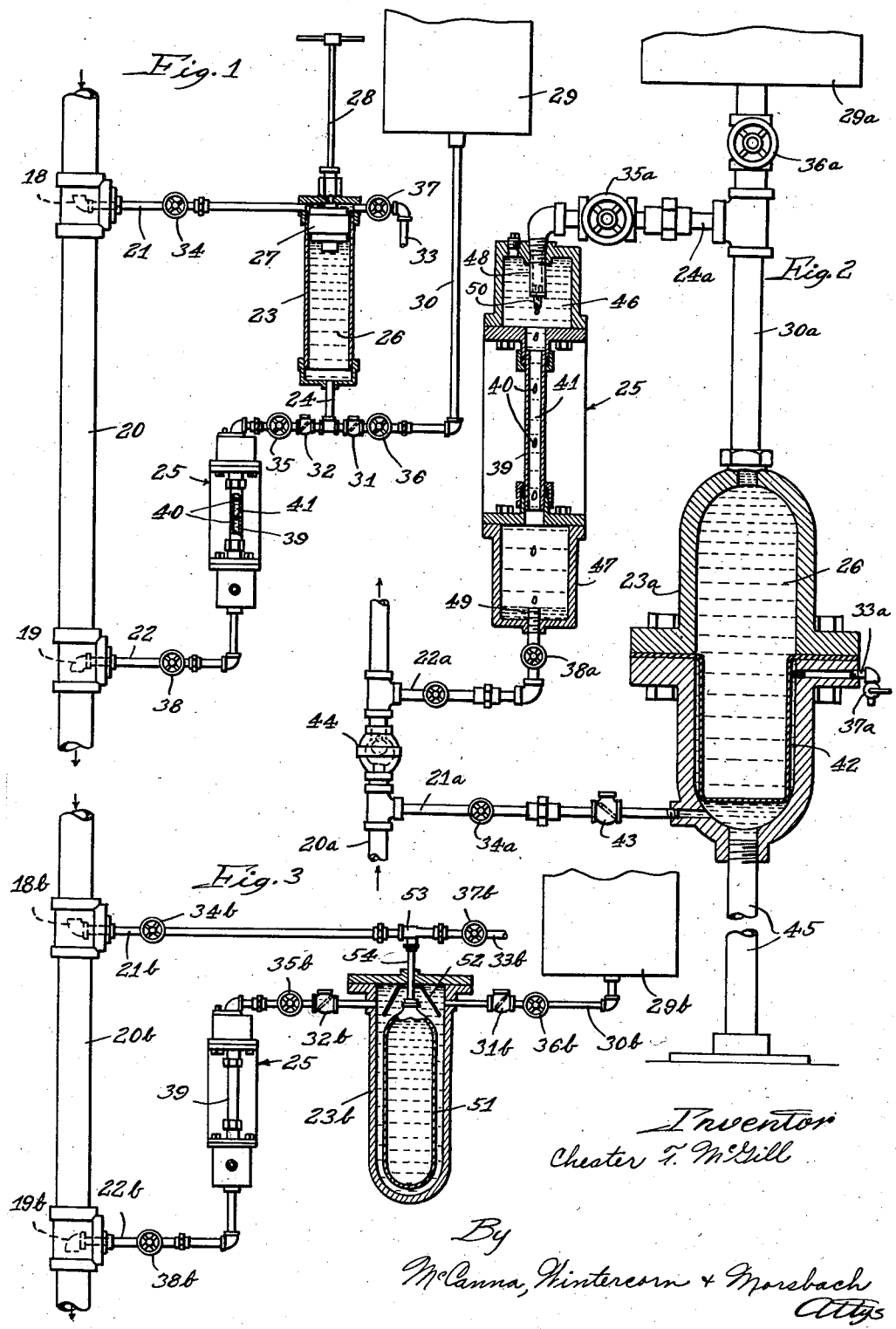
Inventor
Chester T. McGill
By
McCanna, Wintercorn & Morsbach
Attys July 6, 1943. C. T. McGILL 2,323,341
PROPORTIONAL CHEMICAL FEEDER
Filed Oct. 17, 1938 2 Sheets-Sheet 2
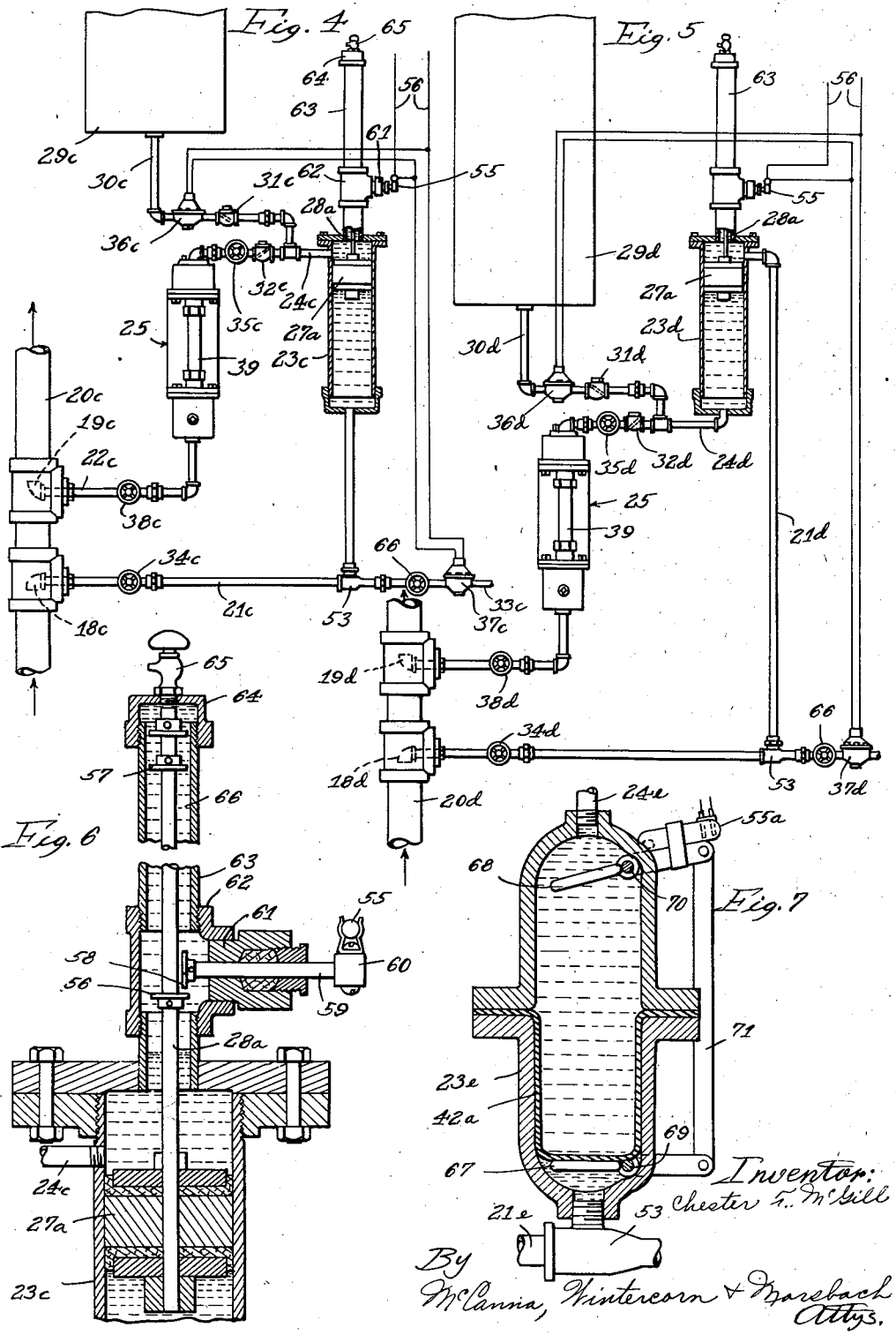
Inventor:
Chester T. McGill
By
McCanna, Wintercorn & Marsbach
Attys.

Patented July 6, 1943

2,323,341

UNITED STATES PATENT OFFICE 2,323,341

PROPORTIONAL CHEMICAL FEEDER

Chester T. McGill, Elgin, Ill., assignor to Elgin Softener Corporation, Elgin, Ill., a corporation of Illinois Application October 17, 1938, Serial No. 235,418

8 Claims. (Cl. 210—38)

This invention relates to proportional chemical feeders adapted to deliver a liquid chemical reagent into a line drop by drop or in a steady stream under adjustable control, the reagent so introduced being a water softening agent, sterilizing agent, coagulating agent, or the like.

I am aware of the many types of feeding equipment that have been devised and placed on the market, but most of them have been subject to the objections that they are too complicated and expensive, they do not permit quick and easy replenishing of the reagent, and they are not designed to insure positive uniform feed in accurate proportion to the fluid flow through the line and do not permit of easy and accurate adjustment of the feed. In the majority of cases, there has been no way of ascertaining by actual observation whether the system was operating properly with the reagent feed occurring at the proper rate, and, as a result, it would take some time before the attendant would know whether any adjustment was necessary, and usually the adjustment was a matter of guess-work and approximation. It is therefore the principal object of my invention to provide a simpler and more economical feeder incorporating a sight feed enabling the operator to check accurately the rate of feed and make accurate adjustments as conditions require, the feeder being furthermore designed with a special view to facilitating and hastening the re-charging of the reagent chamber of the actuator.

Another object of the invention is to provide manually operable and also automatic means for refilling the reagent chamber of the actuator.

The invention is illustrated in the accompanying drawings, in which—

Figs. 1, 2, and 3 show three different forms of proportional chemical feeders partly in section and partly in elevation, these feeders being automatic in their operation in so far as feeding is concerned but having manual control means for refilling the actuator;

Figs. 4 and 5 are similar views of two other feeders which are wholly automatic in operation;

Fig. 6 is an enlarged sectional detail of a portion of Fig. 4 to better illustrate the automatic switch means employed, and Fig. 7 is a fragmentary sectional view of an actuator similar to that shown in Fig. 2, but incorporating automatic control means.

Similar reference numerals are applied to corresponding parts throughout the views.

Referring to Fig. 1, 18 and 19 designate Pitot tubes upstream and downstream relative to one another in the line 20, as indicated by the arrows, and this line may be the general water line leading to a battery of boilers, or it may be a water main supplying water for domestic purposes, or a water main supplying water for industrial purposes, as in bottling plants, breweries, etc., or else a municipal water supply main. However, while the reagent or treating fluid will be introduced into the line through the downstream Pitot tube in this feeder as well as in the others hereinafter described, it should be understood that the reagent might be introduced into a reservoir. The Pitot tubes are faced in opposite directions so as to set up a pressure differential between the pipes 21 and 22 communicating therewith whenever there is any water flowing through the line 20. The pipe 21 communicates with the upper or upstream end of a reagent chamber in what I call the actuator 23 whose lower or downstream end is connected by a pipe 24 with the upper end of a sight feed device 25 onto which the pipe 22, previously mentioned, is connected at the lower end, as shown. The body of liquid, indicated at 26, is the reagent, and this liquid is arranged to be expelled from the chamber in the actuator 23 through the sight feed device 25 and pipe 22, drop by drop, or in a stream, into the line 20 in proportion to the volume of water or liquid to be treated passing through said line. In the present type of actuator 23, a piston 27, retractible to the position shown by means of a hand operable plunger rod 28, is arranged to be moved under pressure of the water in the pipe 21, the amount of movement depending upon the amount of pressure differential existing between the pipes 21 and 22, which in turn is dependent upon the rate of flow through the line 20. 29 is a reagent reservoir which is adapted to supply reagent through a pipe 30 to the lower or downstream end of the reagent chamber in the actuator 23 through a check valve 31. The latter closes automatically to prevent return flow of reagent set into motion by the piston 27, but the other check valve 32 under those conditions opens to allow the reagent to flow through the sight feed device 25 into the line 20. 33 is a pipe extending to the drain, and when the reagent chamber in the actuator 23 is being filled, valves 34 and 35 are closed and valves 36 and 37 are opened so as to permit the escape of water from behind the piston 27 through the pipe 33 to the drain. In this retracting movement of the piston 27 by means of the rod 28, the check valve 31 opens but the check valve 32 closes so that the only flow of reagent will be from the reservoir 29 through the pipe 30 and into the actuator 23. After the latter has been filled, the valves 36 and 37 are closed and valves 34 and 35 are opened. The valves 35 and 36 may be dispensed with, depending upon the accuracy of the check valves 31 and 32, or I may use only valves 35 and 36. The valve 38 is preferably a screw-threaded needle type control valve and is adjusted so as to allow a predetermined amount of reagent to be introduced into the line 20 through the Pitot tube 19, and this valve is adjusted by the operator while he observes the glass sight tube 39 to note the number of drops of reagent per minute passing through the body of oil with which the sight feed device 25 is filled. In slow feeds, one or more of these drops will appear as bubbles passing through the tube 39; in Fig. 1, two such bubbles are indicated at 40, and the oil is indicated at 41. The oil being lighter than water tends to rise, but is trapped by the check valve 32 and is also held back by the steady downflow of reagent from the actuator 23. An operator experiences no difficulty in regulating the feeding of reagent to a given amount of reagent per each hundred gallons of water flowing through the line, and, in that way, the water downstream from the Pitot tube 19 is assured of having the proper pH value or being otherwise properly chemically treated, depending upon the liquid being treated and the kind of chemical employed.

The feeder illustrated in Fig. 2 embodies a different type of actuator 23a in which there is a flexible boot or cupped diaphragm 42 of rubber or heavy fabric separating the body of reagent 26 from the raw water delivered through the pipe 21a from an upstream point in the line 20a. The reservoir 29a in this case communicates with the upper or downstream end of the actuator 23a through a pipe 30a when the valve 36a is opened. Pipe 24a establishes communication between the actuator 23a and the upper end of the sight feed device 25. The lower or downstream end of said device is connected through pipe 22a with the main 20a. In operation, valves 34a, 35a and 38a, corresponding to the valves 34, 35 and 38 in Fig. 1, are opened, but valve 36a corresponding to valve 36 in Fig. 1 is closed, thus establishing a circuit from pipe 21a through the feeder to pipe 22a, so that raw water delivered through pipe 21a from the line 20a will cause reagent 26 to be delivered, in a stream or drop by drop, through the sight feed device 25 by reason of the differential in pressure existing between the upstream pipe 21a and the downstream pipe 22a. In this feeder, the boot or diaphragm 42 takes the place of the piston 27 in the feeder shown in Fig. 1 and is actuated hydraulically to expel reagent from the actuator 23a through the sight feed device 25 into the line 20a. When the flexible boot 42 is reversed and cannot therefore function any further as a piston, the valves 34a and 35a are closed and valve 36a and pet cock 37a are opened. This permits drainage to the waste of the raw water from behind the boot 42 through the pipe 33a and pet cock 37a in the reversal of the boot as reagent supplied from the reservoir 29a enters the actuator 23a and displaces the raw water therefrom. When the actuator 23a is refilled, valve 36a and pet cock 37a are closed and the valves 34a and 35a are opened, thus placing the unit back in operation. 43 is a check valve between the actuator 23a and valve 34a, allowing water to flow through the pipe 21a from the line 20a to the actuator 23a, but not in the reverse direction. In some cases, valve 43 is dispensed with and only hand-operated valves are used. 44 is a fitting which includes a fixed orifice and is disposed between the upstream pipe 21a and downstream pipe 22a to maintain the pressure differential between said pipes whenever there is any flow of water through the line 20a. However, a hand operated control valve or an automatic diaphragm valve that opens and closes to maintain regulated flow regardless of change in the head pressure in the line 20a may be provided. The pipe indicated at 45 is only a supporting standard for the actuator. In passing, special attention is called to the sight feed device 25 which is similar to that shown in Figs. 1 and 3, but is here shown in section on a larger scale so as to give a better idea of the construction, this view showing enlarged manifolds or headers 46 and 47 at opposite ends of the sight tube 39 with nipples 48 and 49 extending therein in alignment with the bore of the glass tube 39, so that the drops 40 or a stream will pass through the tube approximately along the axis thereof. A small nozzle 50 in the end of the nipple 48 is substantially concentric with the tube 39 and nipple 49 and delivers the reagent, in a stream or drop by drop, through the body of light oil or other fluid 41 with which the sight feed device 25 is filled. The nipple 49 need not be exactly concentric with the nozzle 50, because a pool of reagent collects in the bottom of the header 47 around the nipple, as shown, and will flow into the nipple anyway.

The feeder shown in Fig. 3 involves still another piston type actuator 23b in which the piston element is in the form of an inflatable bladder 51 of material like that used for the boot 42, communicating with the upstream pipe 21b so as to be filled with raw water under pressure from the line 20b, 18b being a Pitot tube in the line connected with the upstream pipe 21b. 19b is the downstream Pitot tube connected to the downstream pipe 22b which communicates with the reagent chamber in the actuator 23b, as shown, and includes in said circuit the sight feed device 25. The reagent reservoir 29b is connected with the reagent chamber in the actuator 23b through pipe 30b. 52 is a guard in the actuator which prevents the bladder 51 from getting near either the inlet or the outlet opening, and 53 is an injector nozzle connected, as at 54, with the bladder 51 and on one side with the upstream pipe 21b and on the opposite side with the waste pipe 33b. The check valves 31b and 32b in this apparatus correspond to the check valves 31 and 32 in Fig. 1, and valves 35b and 36b similarly correspond to valves 35 and 36 in that figure. In operation, valves 34b and 35b are opened and valves 36b and 37b are closed, and needle valve 38b is adjusted to the desired restriction to secure the correct proportioning of reagent to the water or other liquid passing through the line 20b. The differential in pressure between lines 21b and 22b accounts for the feeding of reagent under pressure from the actuator 23b through the sight feed device 25 and into the line at Pitot tube 19b, the bladder 51 being inflated more and more and accordingly displacing the reagent from the chamber in the actuator. When the reagent chamber requires refilling, valve 35b is closed and valves 36b and 37b are opened. The rush of water through pipe 21b out to waste through pipe 33b and ejector nozzle 53 results in the entraining of raw water with it from the bladder 51 which accordingly collapses and allows reagent to flow into the chamber in the actuator 23b from the reservoir 29b. In that way, the reagent chamber can be speedily filled and the apparatus put back into operation promptly. The valves 36b and 27b are closed and valve 35b opened to resume normal operation. Here again it is clear that I may use only the valves 35b and 36b or they may be dispensed with if the check valves 31b and 32b are sufficiently accurate, because in normal operation when reagent is expelled from the chamber in the actuator 23b, the check valve 31b seats automatically, and, on the other hand, when the reagent chamber is being filled, there is a certain reduction in pressure created in the reagent chamber as the raw water is withdrawn from the bladder 51, and under those conditions the check valve 32b automatically seats.

Figs. 4 and 5 show feeders closely resembling the one shown in Fig. 1, and having piston type actuators, as shown at 23c and 23d, respectively. However, in these feeders, provision is made for automatically refilling the reagent chamber by closing and opening an electrical circuit through solenoid or motor operated valves, as at 36c and 37c in Fig. 4; 36d and 37d in Fig. 5. In both feeders, a mercury switch 55 is employed to open and close the circuit through said valves from the electrical supply line 56, the switch being moved to open circuit position by a cam 56 on the rod 28a moving with the piston 27a when the piston reaches its fully retracted position in the reagent chamber in the actuator (see Fig. 6). Another cam 57 on the rod 28a throws the switch 55 to closed circuit position at the opposite end of the stroke of the piston, namely, when the reagent chamber is emptied, or nearly so. 58 is a rocker arm on the end of a shaft 59 which carries a holder 60 on the outer end thereof for the bulb of the mercury switch 55. The shaft 59 is carried in a combination bearing and stuffing box 61 mounted on a T-fitting 62 communicating with one end of the reagent chamber in the actuator 23c or 23d, as the case may be, and there is a stand-pipe 63 extending upwardly from the fitting 62 to enclose the upper end of the rod 28a throughout the full stroke of the piston 27a. A cap 64 closes the upper end of the pipe and has a bleeder valve 65 thereon to permit escape of air. Fluid indicated at 66 is any suitable light oil and fills the stand-pipe 63 and fitting 62, reaching down to a level near the upper end of the reagent chamber in the actuator, as indicated. In that way, there will be no danger of objectionable corrosion of the parts of the switch operating mechanism.

The feeders of Figs. 4 and 5 are alike except that in Fig. 4 the raw water enters the lower end of the actuator 23c through upstream pipe 21c to expel the reagent by upward movement of the piston 27a, whereas in Fig. 5 the raw water enters the upper end of the actuator 23d through upstream pipe 21d to expel the reagent by downward movement of the piston 27a. Accordingly the feeder, as shown in Fig. 4, is ready for refilling of the reagent chamber in the actuator 23c, and the parts of the automatic switch operating mechanism operated by the piston 27a are shown under those conditions in Fig. 6. Fig. 5 shows a reverse condition at the end of the refilling operation, the reagent chamber in the actuator 23d being substantially filled with reagent. The operation of the feeder of Fig. 4 is as follows: Due to the difference in pressure between the upstream and downstream pipes 21c and 22c, raw water enters the lower end of the actuator 23c and forces the piston 27a upwardly so as to expel reagent from the chamber in the actuator out through the sight feed device 25 into the line 20c at a rate determined by the setting of the needle control valve 38c. This operation continues until nearly all of the reagent has been expelled from the actuator 23c, at which time the cam 56 moves the rocker arm 58, thereby throwing the mercury switch 55 to closed circuit position and opening the valves 36c and 37c. The rush of raw water through the upstream pipe 21c out through the waste pipe 33c entrains raw water with it from beneath the piston 27a in the actuator 23c, and reagent accordingly is free to enter the upper end of the reagent chamber by gravity flow from the reservoir 29c. The valve shown at 66 in the waste pipe 33c is always open except in emergencies. Obviously it requires very little time for the actuator 23c to be refilled, and when the piston 27a reaches the end of its downward travel, the cam 57 shifts the rocker arm 58 back to the position shown in Fig. 6 and throws the mercury switch 55 back to open position, accordingly closing the valves 36c and 37c automatically. The feeder then resumes its operation. It will be understood that valves 34c, 35c, and 66 are kept open except in emergencies. There is no necessity for outlining the operation of the feeder shown in Fig. 5, in view of its close similarity to that of Fig. 4.

I may employ an automatic actuator like that shown at 23e in Fig. 7 in place of either of the actuators 23c and 23d. In this case, a flexible boot or diaphragm 42a similar to that shown in Fig. 2 is provided in the reagent chamber arranged to operate tappets 67 and 68 at opposite ends of its travel. These tappets are pivoted at 69 and 70 and interconnected, as at 71, and one of said tappets carries the mercury switch 55a. In operation, assuming that the reagent chamber in the actuator 23e has been filled, as indicated by the fact that the tappet 67 has been depressed and has accordingly thrown the mercury switch 55a to open circuit position, the raw water from the upstream pipe 21e enters the lower end of the actuator and forces the boot 42a upwardly so as to expel reagent through the pipe 24e and into the line through a sight feed device similarly as heretofore described. When the boot 42a is reversed and nearly all of the reagent has been expelled from the actuator 23e, the tappet 68 is operated to throw the mercury switch 55a to closed circuit position so as to open a reagent valve and a waste valve like the valves 36c and 37c, respectively, in Fig. 4. The raw water rushing through the upstream pipe causes the entraining of water from the actuator 23e through the ejector 53 and reagent is accordingly allowed to flow in under gravity from the reservoir similarly as described in relation to Fig. 4. In the operation of automatically re-charged feeders like this one and the ones shown in Figs. 4 and 5, the storage tank or reservoir for reagent should be of sufficient capacity to fill a predetermined number of days' or weeks' requirements.

It is believed the foregoing description conveys a good understanding of the objects and advantages of my invention. The appended claims have been drawn with a view to covering all legitimate modifications and adaptations.

I claim:

1. A proportioning apparatus comprising in combination with a conduit through which fluid is adapted to flow in one direction, a receptacle for treating fluid having a discharge pipe communicating with the fluid conduit to conduct treating fluid thereto, and an inlet pipe communicating with the conduit to conduct fluid from the conduit to the receptacle, means cooperating with the fluid conduit and said discharge and inlet pipes to create a pressure differential between said pipes only when fluid flows through the conduit under pressure, whereby treating fluid is discharged into the conduit only when there is fluid flow therethrough, piston means movable in one direction in said receptacle under pressure of fluid from said inlet pipe to expel treating fluid from said receptacle through said discharge pipe into the conduit, a drain including a shut-off valve communicating with said receptacle on the inlet pipe side of the piston means for drainage from the receptacle of fluid from the fluid conduit to permit return of the piston means to a retracted position, another receptacle containing treating fluid adapted to be placed in communication with the first receptacle on the discharge pipe side of the piston means to refill said receptacle with treating fluid, and a fluid ejector communicating at one end with the drain and at the other end with the inlet pipe and at an intermediate point with the first named treating fluid receptacle on the inlet pipe side of the piston means, said ejector being arranged when the drain is opened into communication with said first-named receptacle to withdraw fluid therefrom by ejector action.

2. A proportioning apparatus comprising, in combination with a conduit through which fluid is adapted to flow in one direction, a receptacle for treating fluid having a discharge connection communicating with the fluid conduit and an inlet connection communicating with the conduit, a sight feed device together with a manually adjustable metering valve included in said outlet connection, piston means in said receptacle operative under pressure of fluid from the inlet connection to expel treating fluid into said fluid conduit through said sight feed device, another receptacle containing treating fluid and having means for placing the same in communication with the first receptacle on the outlet side relative to the piston means, whereby to refill said receptacle when the piston means is retracted, a drain, an ejector in the inlet connection connected for discharge through one end to the drain and communicating at the other end with the fluid conduit and at an intermediate point with the first-named treating fluid receptacle on the inlet connection side of the piston means, and a valve for opening communication between said ejector and said drain.

3. A proportioning apparatus comprising, in combination with a conduit through which fluid is adapted to flow in one direction, a receptacle for treating fluid having a discharge connection communicating with the fluid conduit and an inlet connection for said receptacle communicating with the conduit, piston means having movement in said receptacle under the pressure of fluid from said inlet connection to discharge treating fluid from said receptacle through the outlet connection, a drain for communication with said receptacle on the fluid inlet side of the piston, a storage receptacle containing treating fluid, valve means controlling communication between the outlet side of the first receptacle and the storage receptacle and between the inlet side of the first receptacle and said drain, and means for operating said valve means operable automatically by said piston means when it approaches the end of its treating fluid discharging movement to place the outlet side of said first receptacle in communication with the storage receptacle for refilling the same and to place the inlet side of said first receptacle in communication with said drain to permit return movement of the piston means.

4. An apparatus as set forth in claim 3, wherein the means for operating said valve means is operable electrically and includes a source of electric current supply, and switch means operable by the piston means and controlling connections between said electrical valve operating means and the source of electric current supply.

5. A proportioning apparatus comprising, in combination with a conduit through which fluid is adapted to flow in one direction, a receptacle for treating fluid having a discharge connection communicating with the fluid conduit and an inlet connection for said receptacle communicating with the conduit, piston means having forward movement in said receptacle under the pressure of fluid from said inlet connection to discharge treating fluid from said receptacle through the outlet connection, a storage receptacle for treating fluid, valve means for placing said storage receptacle into communication with the aforesaid receptacle on the outlet side of the piston means, and means automatically operable by the piston means when it approaches the end of its forward movement for opening said valve means to refill the first receptacle with treating fluid.

6. An apparatus as set forth in claim 5, wherein the last mentioned means is operable electrically and includes a source of electric current supply and switch means controlling connection between said electrically operated valve means and the source of electric current supply.

7. In a liquid chemical feeder device, the combination of a cylinder, a source of liquid chemical supply, a piston movable in said cylinder to expel liquid chemical from one end thereof in the forward movement of the piston and draw liquid chemical from the source of liquid chemical supply into the cylinder upon return movement of said piston, means for moving said piston, a fluid container adapted to receive the liquid chemical discharged from said cylinder, a pipe connection communicating with the end of said cylinder to direct the liquid chemical discharged therefrom to said fluid container and also direct liquid chemical into said cylinder from the source of liquid chemical supply, valve means controlling the delivery of liquid chemical to said pipe connection, means for operating said valve means electrically, a source of electric current supply, and switch means controlling connection between said valve means and the source of electric current supply, said piston means having means movable therewith for automatically operating the switch means when the piston approaches the end of forward travel.

8. A proportioning apparatus comprising, in combination with a through-flow conduit conducting fluid therethrough to be treated, a closed receptacle containing a collapsible and expansible bladder separating treating fluid on the outside of the bladder from conduit fluid inside the bladder and expansible under pressure of fluid from the conduit so as to discharge treating fluid from the receptacle, means for supplying treating fluid to said receptacle outside the bladder, a treating fluid outlet pipe between the receptacle and the conduit, an inlet pipe between the bladder and the conduit at a point spaced from the treating fluid outlet pipe, a drain open to the atmosphere and adapted to communicate with the bladder, a valve for opening and closing such communication, and an ejector in the inlet pipe connected for discharge through one end to the drain and communicating at the other end with the inlet pipe and at an intermediate point with the bladder.

CHESTER T. McGILL.